United States Patent [19]

Aoki

[11] Patent Number: 4,486,750
[45] Date of Patent: Dec. 4, 1984

[54] DATA TRANSFER SYSTEM

[75] Inventor: Tetsuo Aoki, Kohnosu, Japan

[73] Assignee: Takeda Riken Co. Ltd., Tokyo, Japan

[21] Appl. No.: 378,267

[22] Filed: May 14, 1982

[30] Foreign Application Priority Data

May 18, 1981 [JP] Japan ................................ 56-74624

[51] Int. Cl.³ .............................................. H04Q 9/00
[52] U.S. Cl. ............................. 340/825; 340/825.14; 370/91
[58] Field of Search .......................... 340/825, 825.14; 370/91, 61, 85

[56] References Cited

U.S. PATENT DOCUMENTS

4,366,478 12/1982 Masuda et al. ..................... 340/825

Primary Examiner—Donald J. Yusko
Attorney, Agent, or Firm—Staas & Halsey

[57] ABSTRACT

Control side equipment and at least one equipment under control are commonly interconnected via a data line and a strobe line. The equipment under control is provided with means for retaining the logic of a strobe pulse when it is received from a strobe line. When the control side equipment has set data on the data line and provided the strobe pulse on the strobe line, the logic hold means of the equipment under control holds the logic of the strobe pulse and the data set on the data line is fetched therefrom into the equipment. Thereafter, the logic hold is released to thereby inform the control side equipment that the equipment under control is ready for receiving the next data. The control side equipment monitors the strobe line and, upon detection of the information, sets new data on the data line and sends out a strobe pulse. Thereafter, similar operations are carried out, by which data are sequentially transferred from the control side equipment to the equipment under control. In the case of transferring data from the equipment under control to the control side equipment, when the control side equipment sends out a strobe pulse representing that it is ready for receiving data, the logic hold means of the equipment under control holds the logic of the strobe pulse, data is set on the data line and then the logic hold is released, by which the control side equipment is informed that the data to be transferred has been set. Upon detection of releasing of the logic hold by monitoring the strobe line, the control side equipment fetches the data from the data line and when it has become ready for receiving the next data, it sends out a strobe pulse again, thus, fetching data one after another.

23 Claims, 20 Drawing Figures

FIG. 6A  FIG. 6B

DATA TRANSFER SYSTEM

BACKGROUND OF THE INVENTION

The present invention relates to a data transfer system which is designed to perform data transfer, for example, between CPUs or between a CPU and one or more terminal devices with a smaller number of control lines.

An asynchronous data transfer system of the conventional handshake system is disclosed in, for instance, U.S. Pat. No. 3,810,103 "Data Transfer Control Apparatus" issued on May 7, 1974. In this prior art, one data source which is a control side and a plurality of data receiving sides are interconnected via a data line for transferring data from the former to the latter and three control lines for controlling the data transfer. The three control lines are respectively an RFD line for sending to the control side a signal indicating that each receiving side is ready for receiving data (Ready for Data signal), a DAV line for sending to the receiving sides a signal indicating that data set by the control side on the data line is valid (Data Valid signal), and a DAC line for sending to the control side a signal indicating that each receiving side has received the DAV signal and accepted the data on the data line. Since such transfer control from the establishment of what is known as a HANDSHAKE between the data source and the receiving sides to the completion of one data transfer is carried out by using such three independent control lines, the efficiency of utilization of the control lines is poor and the cost of a transmission cable including the data line, too, inevitably becomes higher by that.

SUMMARY OF THE INVENTION

It is therefore an object of the present invention to provide a data transfer system which enables asynchronous data transfer, i.e. data transfer of the handshake system through the use of one control line.

Another object of the present invention is to provide a data transfer system which is small in the number of transmission lines used, and hence is inexpensive.

Yet another object of the present invention is to provide a data transfer system which is able to perform the abovesaid objects and which is simple in arrangement.

According to the present invention, a control side equipment and an equipment under control are interconnected via at least a data line and one strobe line. The control side equipment is provided with, for instance, data transmitting and receiving means for sending out data on the data line and receiving data from the data line, strobe pulse send-out means for sending out a strobe pulse on the strobe line, and means for monitoring the logic of the strobe line. On the other hand, the equipment under control is provided with means for data receiving and/or transmitting means, hold means for holding the strobe line at the logic of the strobe pulse when receiving it, means for detecting the logic of the strobe line, and means for releasing the holding of the strobe logic. In the case of transferring data from the control side equipment to the equipment under control, data is set on the data line and a pulse of logic state indicating that the data has been set is provided on the strobe line. Upon receiving from the strobe line a pulse indicating that the data has been set, the equipment under control fetches the data from the data line while holding the logic state of the strobe pulse by the holding means and, after the fetching of the data, the holding of the logic state is released. After sending out the pulse, the control side equipment monitors the strobe line and, upon detection of release of the holding of the logic state in the equipment under control, the control side equipment sets the next data on the data line and provided on the strobe line a pulse of the logic state indicating that the next data has been set. Thereafter, the equipment under control fetches the data while holding the logic of the strobe pulse and releases the holding of the logic in the same manner as described above.

In the case where the control side equipment receives data from the equipment under control, the former sends a pulse via the strobe line to the latter and, upon detecting from the pulse that the control side equipment is ready for receiving data, the equipment under control sets data on the data line while holding the logic state of the received pulse and then releases the holding of the logic state. The control side equipment monitors the strobe line after sending out the pulse and, upon detection of the release of the holding of logic state, fetches the data from the data line and then provided on the strobe line a pulse indicating that the control side equipment is ready for receiving new data. Thereafter, the control side equipment receives data from the equipment under control one after another in the same procedure described above. Accordingly, it is possible for the control side equipment to decide, by monitoring the strobe line, the state in which the equipment under control has fetched data or the state in which the equipment under control has set data on the data line, and to send out or fetch the next data based on the result of the decision. The equipment under control detects from the pulse on the strobe line that data has been sent from the control side equipment, or that the control side equipment has become ready for receiving the next data, and the equipment under control receives or sends out the next data based on the detection. Furthermore, since a pulse is provided on the strobe line upon each data transmission, it is also possible to perform what is called a synchronous data transfer. That is to say, the equipment under control can also be designed so that, upon arrival of a pulse on the strobe line, data on the data line at that time is inputted in synchronism with the pulse. Thus, according to the present invention, by providing means for holding the logic of a strobe pulse in the equipment under control, asynchronous data transfer can be carried out through using only one strobe line as a control line.

DETAILED DESCRIPTION OF THE PREFERRED EMBODIMENTS

Figure 1:
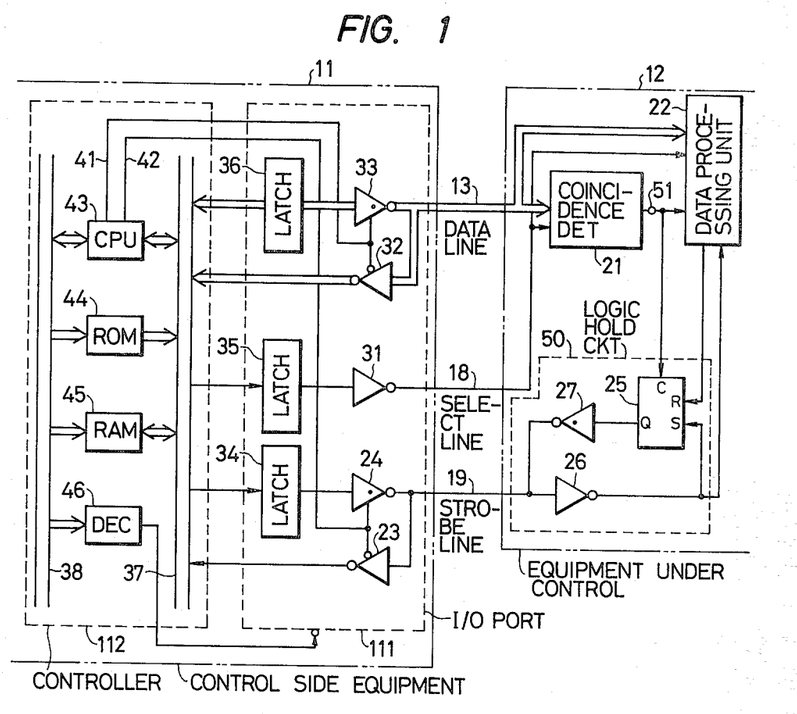
FIG. 1 is a diagram illustrating control side equipment 11 and equipment under control 12 of a data transfer system according to a preferred embodiment of the present invention.

A description will be given, with reference to FIG. 1, of an embodiment of the data transfer system according to the present invention. This embodiment is adapted so that an address for designating an equipment under control is transmitted over a data line 13. To perform this, a select line 18 is connected between a control side equipment 11 and an equipment under control 12.

There has heretofore been known such a system in which data and address are transmitted over the same data line and through utilization of the select line 18, data and address are distinguished from each other according to the logic status of a signal on the select line 18. For instance, the definition is formulated in advance that a signal on the data line 13 represents an address or data depending upon whether the signal on the select line 18 is low-level or high-level. It will be understood that no select line is needed in the case where a line for transmitting an address is provided separately from the data line 13.

Data to be transferred from a controller 112 of the control side equipment 11 is latched in a latch circuit of an input/output port 111 and then inputted to a driver 33. This data is set as inverted data of plural parallel bits by the driver 33 on the data line 13. Upon setting the data on the data line 13, a signal indicating whether the information on the data line 13 is an address or data is applied from the controller 112 via a latch 35 to a driver 31, the output from which is provided on the select line 18. Conversely, in the case of receiving data from the data line 13, such information is inputted via a receiver 32 of the input/output port 11 to an internal data bus 37 of the controller 112.

A strobe signal is applied via the internal bus 37 from the controller 112 to a latch 34, from which the strobe signal is provided on a strobe line 19 by a driver 24 which is of the type having an open-collector output. During operations other than the strobe signal sending out, the logic status of the strobe line 19 is inputted via a receiver 23 to the internal data bus 37 for monitoring the logic status of the strobe line 19 at all times. The driver 33 and the receiver 32 connected to the data line 13 are adapted so that when one of them is enabled by a signal from an internal control line 41, the other is disabled. Similarly, the driver 24 and the receiver 23 are adapted so that when one of them is enabled by a signal from an internal control line 42, the other is disabled. In the present invention, the I/O port 111 and the controller 112 are constituted, for instance, by a one-chip microprocessor. Accordingly, there are provided a CPU 43 for controlling the operation of the control side equipment 11, a ROM 44 for storing a program described a control procedure, a RAM 45 for inputting data and a decoder 46 for selecting one I/O port of the microprocessor and enabling it, and these are interconnected via the internal data bus 37 and an address bus 38 of the controller 112.

In the equipment under control 12, the data line 13 and the select line 18 are connected to a coincidence detector 21. When the select line 18 is low-level, a signal on the data line 13 is decided to be address data and it is automatically inputted into the coincidence detector 21, wherein it is checked whether the address is that of the equipment under control 12. The data line 13, the select line 18 and an output terminal 51 of the coincidence detector 21 are connected to a data processing unit 22. The data processing unit 22 is designed so that it can fetch thereinto the data on the data line 13 when the address of the equipment under control 12 is detected by the coincidence detector 21.

In the state in which the address of the equipment under control 12 has been detected by the coincidence detector 21, when receiving a pulse on the strobe line 19, a logic hold circuit 50 holds the strobe line 19 at logic "0" of the pulse. The logic hold circuit 50 for the strobe line 19 comprises, for example, a flip-flop 25, an inverter 26 having its input connected to the strobe line 19 and its output connected to a set terminal of the flip-flop 25 and the data processing unit 22, and an open-collector type inverter 27 having its input connected to a Q output of the flip-flop 25 and its output connected to the strobe line 19. The flip-flop 25 has its clear terminal C connected to the output terminal 51 of the coincidence detector 21 and its reset terminal R connected to the data processing unit 22. When having detected the address, the coincidence detector 21 provides a low-level output at the terminal 51 to make the clear terminal C of the flip-flop 25 low-level, making the flip-flop 25 operable. The low level at the output terminal 51 is maintained until completion of the entire data transfer to the equipment under control 12. In such a state, the strobe pulse on the strobe line 19 is inputted via the inverter 26 to set the flip-flop 25. Consequently, the Q output of the flip-flop 25 is held at "1" and the inverter outputs "0". Even if the strobe pulse ("0" logic) of the control side equipment 11 immediately recovers to "1", since the output side of the inverter 24 is open-collector type, its output impedance is high and, therefore, the strobe line 19 is forced to remain low-level "0" by the output "0" from the inverter 27 of the equipment under control 12. The data processing unit 22 monitors the output from the inverter 26 (which may also be the Q output from the flip-flop 25) and loads thereinto the data on the data line 13 upon detection of the state in which the strobe line 19 is retained at "0" as described above. The data processing unit 22 performs processing of the data, after which, when it has become ready for loading thereinto the next data, it resets the flip-flop 25 to release the strobe line 19 from the state of logic "0" by the flip-flop 25, putting the strobe line 19 into the state of logic "1".

Figure 2:
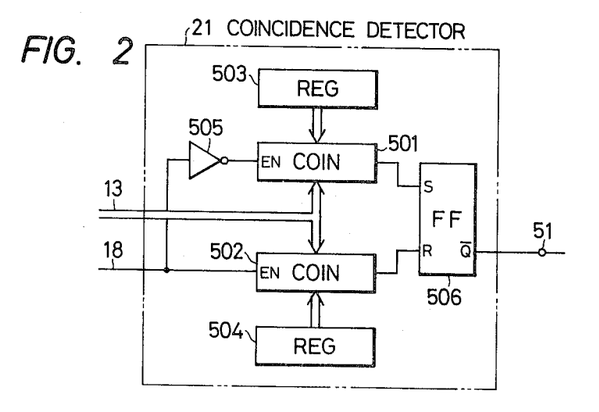
FIG. 2 shows a specific example of a coincidence circuit 21 for use in the equipment under control 12 in FIG. 1.

The data processing unit 22 for controlling the operation of the equipment under control 12 is constituted by an ordinary microprocessor, which is substantially identical in construction with that described, later in connection with FIG. 5, for instance, so that no particular description will be given here. The coincidence detector 21 has an arrangement, for example, such as shown in FIG. 2. In this case, two coincidence circuits 501 and 502 are connected to the data line 13. The coincidence circuit 501 detects coincidence between the input address data and the self-address, whereas the coincidence circuit 502 detects the coincidence of a data end code which is representative of the end of data to be transmitted. The coincidence circuits 501 and 502 are respectively connected to a register 503 having set therein the self-address and a register 504 having set therein the data end code. In the event that the select line 18 is "0", the coincidence circuit 501 is enabled via an inverter 505, and when the select line 18 is "1", the coincidence circuit 502 is enabled. Upon detection of address coincidence by the coincidence circuit 501, its high-level output is applied to a set terminal S of a flip-flop 506 and a low-level output from its $\bar{Q}$ output is provided to and held at the output terminal 51 of the coincidence detector 21. When the data end code is detected by the coincidence circuit 502, its high-level output is applied to the flip-flop 506 to reset it. As a result of this, a high-level output is provided to the output terminal 51 of the coincidence detector 21 and this high-level output is supplied to the clear terminal C of the flip-flop 25 of the logic hold circuit 50 to disable it. At the same time, the high-level is applied to the data processing unit 22 as well.

Figures 3A, 3B:
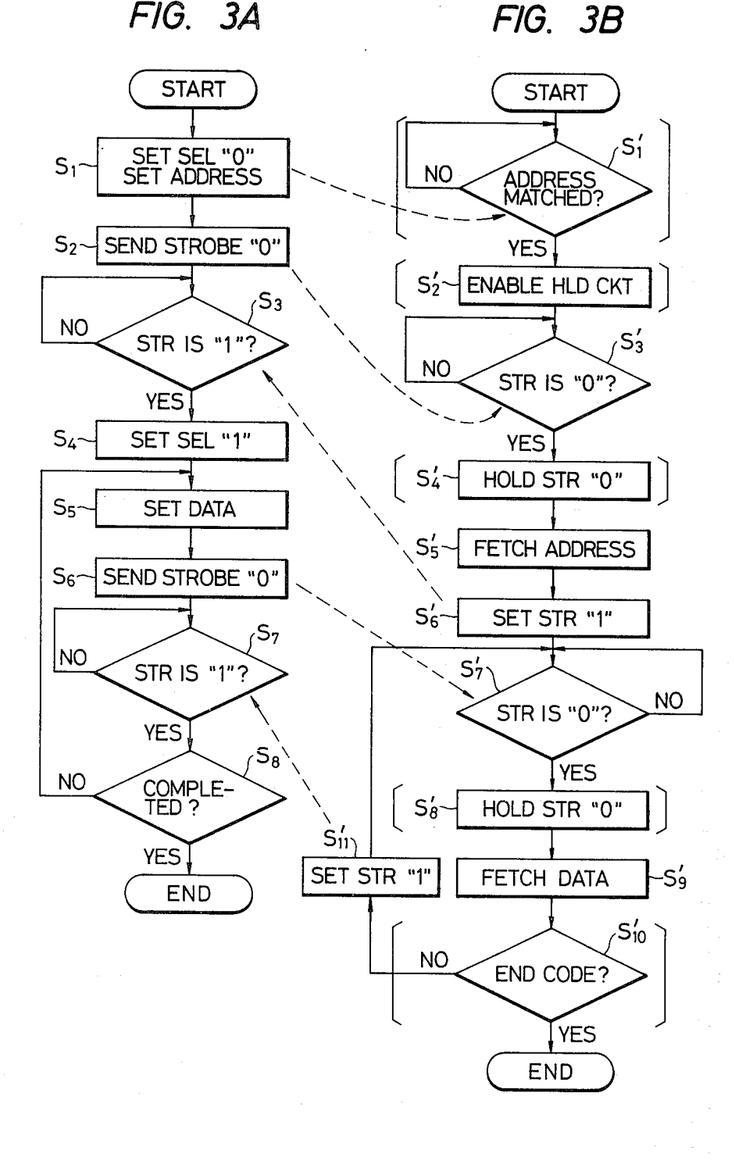
FIGS. 3A and 3B respectively show the flows of operations in the equipment 11 and 12 in the data transfer system in FIG. 1.
Figure 4A:
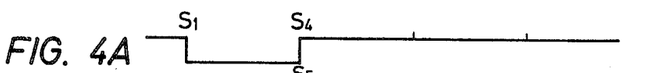
FIGS. 4A, 4B and 4C respectively show the states of a select line 18, a data line 13 and a strobe line 19 in the operations of the data transfer system depicted in FIG. 1.
Figure 4B:
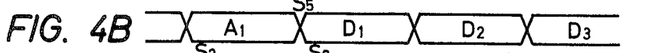

A description will be given, with reference to FIGS. 3A, 3B, 4A, 4B and 4C, of the procedure of the data transfer. For instance, as shown in FIG. 4A, in the control side equipment 11 the select line 18 is made low-level in step $S_1$ as indicated in FIG. 3A and an address $A_1$ is provided on the data line 13 as shown in FIG. 4B. A little after the delivery of the address $A_1$ a strobe pulse "0" is sent out on the strobe line 19 in step $S_2$, the beginning of which is accordingly labelled depicted in FIG. 4C.

Figure 4C:
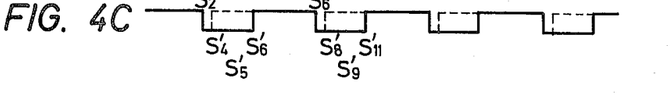

On the other hand, in the equipment under control 12, when the select line 18 has become low-level, the signal $A_1$ on the data line 13 is automatically brought into the coincidence detector 21 in step $S'_1$, as shown in FIG. 3B, and it is checked whether the address $A_1$ is the self-address. When the address $A_1$ is decided to be the self-address, the coincidence detector 21 yields a low-level output and the flip-flop 25 is activated in step $S'_2$, enabling the logic hold circuit 50. Thereafter, when the strobe pulse "0" is provided on the strobe line 19 as described above, the pulse "0" is detected in step $S'_3$ and the flip-flop 25 is set in step $S'_4$, holding the strobe line 19 low-level as shown in FIG. 4C. The data processing unit 22 fetches data from the data line 13 in step $S'_5$ but this data is not used since it is the self-address $A_1$. After the data loading operation, the data processing unit 22 supplies, in step $S'_6$ to a reset terminal R of the flip-flop 25, a signal "1" indicating that the data processing unit 22 is ready for accepting new data, thus resetting the flip-flop 25. In consequence, the strobe line 19 becomes high-level (Fig. 4C).

As described previously, the control side equipment 11 monitors the status of the strobe line 19 and when it is detected in step $S_3$ that the strobe line 19 has become high-level to make the equipment under control 12 ready for receiving data, the control side equipment 11 sets the select line 18 to "1" in step $S_4$ as shown in FIG. 4A and, in step $S_5$, sets data $D_1$ on the data line 13 as depicted in FIG. 4B. Following this, the strobe pulse "0" is delivered to the strobe line 19 in step $S_6$ as shown in FIG. 4C.

In the equipment under control 12, upon detection of the strobe pulse in step $S'_7$, the flip-flop 25 is set again to hold the strobe line 19 low-level (step $S'_8$). The data processing unit 22 monitors the output from the inverter 26 (which may also be the output from the flip-flop 25) and, upon detection of the data setting state, fetches the data $D_1$ from the data line 13 in step $S'_9$ and carries out processing therefor. In the case where no data end code is detected in step $S'_{10}$, the data processing unit 22 provides a high-level output indicating that it is ready for receiving the next data, by which the flip-flop 25 is reset, returning the strobe line 19 to its high-level state as shown in FIG. 4C (step $S'_{11}$). Thereafter the operation returns to step $S'_7$ in which to detect the next strobe.

In the control side equipment 11, when it is detected in step $S_7$ that the strobe line 19 has become high-level and further it is detected in step $S_8$ that the data transfer has not been completed yet, the operation returns to step $S_5$ in which the next data $D_2$ is set again to the data line 13 and a pulse is sent out to the strobe line 19 to set the flip-flop 25, holding the strobe line 19 at low-level in the same manner as described above. Thereafter the same operations are repeated. The equipment under control 11 is informed of the completion of the data transfer by adding END CODE data to the end of the data to be transferred as described above, or by specifying the number of data. In the operational flowchart of FIG. 3B, steps $S'_1$, $S'_2$, $S'_4$, $S'_8$ and $S'_{10}$ are executed by the coincidence detector 21 and the logic hold circuit 50 which are part of the hardware of the circuit and hence they are not included in the control program in the data processing unit 22.

Next, a description will be given, with reference to FIG. 5, of the case in which the equipment under control 12 is capable performing either of data reception or transmission. Since the control side equipment 11 is identical with that in FIG. 1, only the equipment under control 12 is shown in FIG. 5. In the equipment under control 12 of FIG. 5, the coincidence detector 21 is not provided and its operation is performed by the data processing unit 22 comprising a controller 222 and an I/O port 221. The data line 13 is connected to an internal data bus 65 via a receiver 54 in the I/O port 221, so that the received data or address can be fetched into the controller 222. The I/O port 221 and the controller 222 are constituted, for instance, by a one-chip microprocessor. This microprocessor performs the detection of address coincidence, the decision of data reception or transmission, the detection of completion of data transfer, monitoring of the select line 18 and the strobe line 19 and control of the logic hold circuit 50.

The internal data bus 65 is connected to the data line 13 via a latch 55 and a driver 56 so that data can be sent out. The logic status of the select line 18 is fetched via a receiver 58 into the internal data bus 65 and, according to the logic status, a CPU 64 decides whether information on the data line 13 is an address or data. The logic hold circuit 50 is identical in construction with that shown in FIG. 1 but the clear terminal C and the reset terminal R of the flip-flop 25 are connected to the internal data bus 65 via drivers 52 and 57 of the I/O port 221, respectively. The logic status of the strobe line 19 is inputted via a receiver 53 from the output of the inverter 26 and is decided by the CPU 64.

The control side equipment 11 assigns one bit of the address data for distinguishing between the cases commanding the equipment under control 12 to receive data (a RECEIVE DATA command) and to send out data (SEND DATA command). The controller 222 of the equipment under control 12 decides the status of the abovesaid assigned bit of the fetched address data and controls the respective operation of data reception or transmission. To perform this, the controller 222 has the CPU 64, a ROM 61, a RAM 62 and a decoder 63, which are interconnected via the internal data bus 65 and an internal address bus 66. Since this arrangement is the same as that in ordinary microprocessors, no description will be given thereof.

Figure 5:
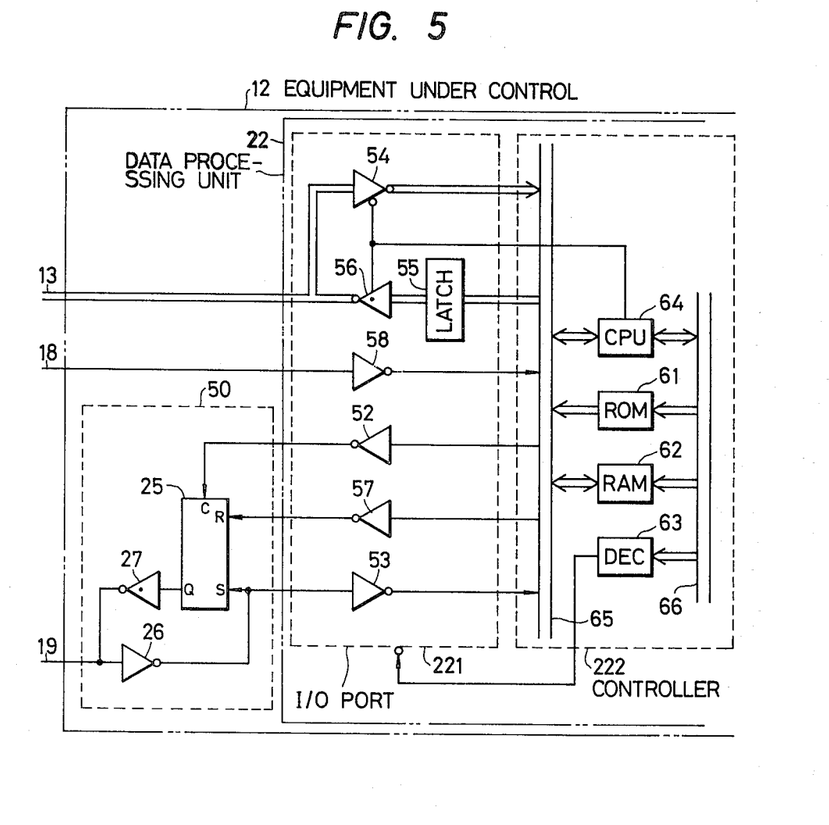
FIG. 5 illustrates another example of the equipment 12 of the data transfer system of the present invention.
Figures 6A, 6B:
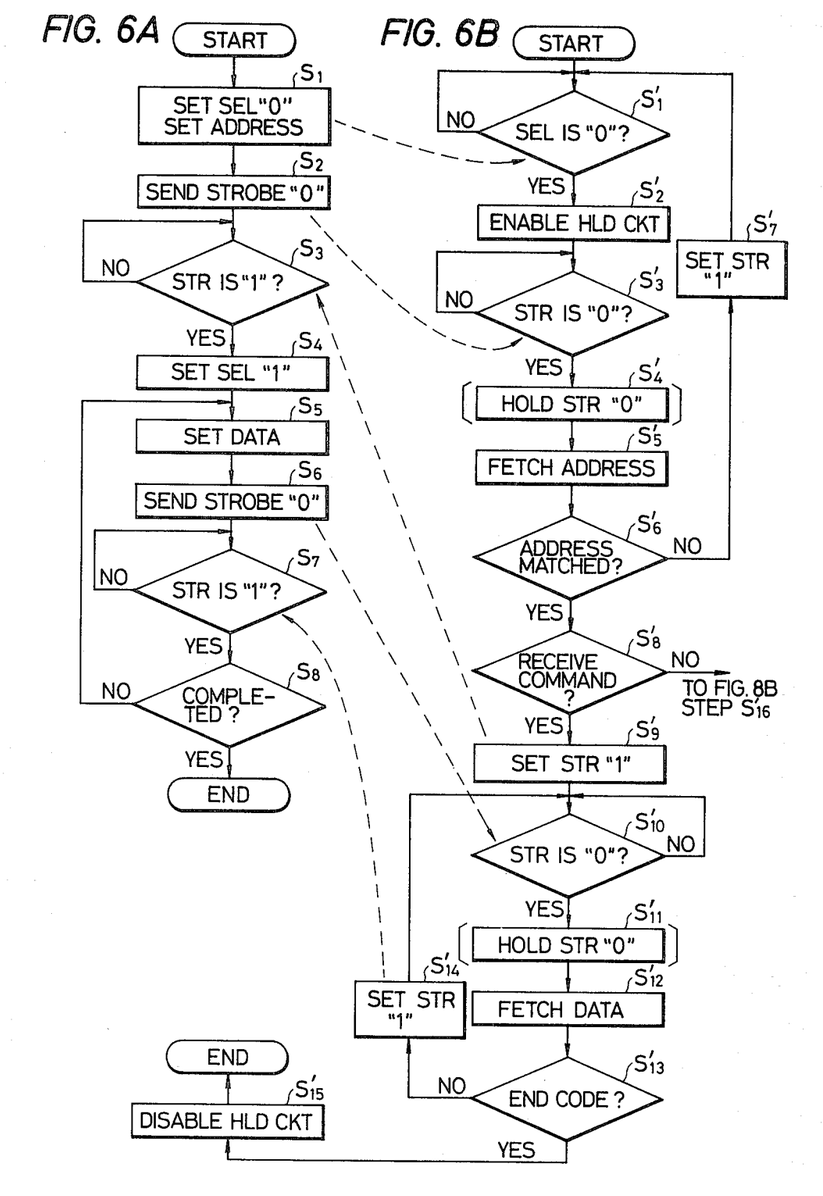
FIGS. 6A and 6B respectively show the flows of operations of the equipments 11 and 12 in the case of transferring data from the former to the latter.
Figure 7A:
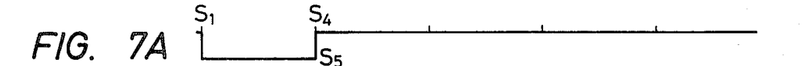
FIGS. 7A, 7B and 7C respectively show the states of the select line 18, the data line 13 and the strobe line 19 in the data transfer operations shown in FIGS. 6A and 6B.
Figures 7B, 7C:
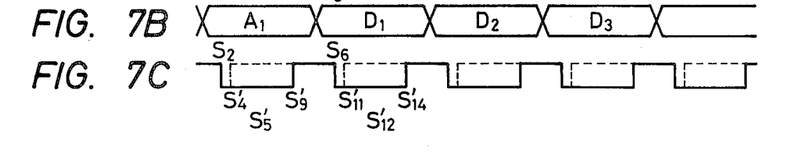

A description is now given, with reference to FIGS. 6A, 6B, 7A, 7B and 7C, of the flow of operations in the case of data being transferred from the control side equipment 11 to the equipment under control 12 depicted in FIG. 5. The flow of operations in the control side equipment 11 is illustrated in FIG. 6A and the flow of operations in the equipment under control 12 is shown in FIG. 6B. FIGS. 7A, 7B and 7C illustrate the states of the select line 18, the data line 13 and the strobe line 19, respectively. The CPU 43 on the control side in FIG. 1 monitors the strobe line 19 via the receiver 23 and, when having confirmed that the strobe line 19 is in the high-level "1" state, the CPU 43 sets address data $A_1$ of the equipment under control 12 on the data line 13 via the latch 36 and the driver 33 in step $S_1$ (FIG. 7B) and, at the same time, the CPU 43 sets via the latch 35 and the driver 31 on the select line 18 "0" logic indicating that the data set on the data line 13 is an address (FIG. 7A). Next, in step $S_2$, a strobe pulse of "0" logic is sent out on the strobe line 19 via the latch 34 and the driver 24 (FIG. 7C).

In the equipment under control 12, the CPU 64 monitors the select line 18 via the receiver 58 in step $S'_1$ and, upon detection of "0", it applies a low-level output to the clear terminal C of the flip-flop 25 via the driver 52, enabling the logic hold circuit 50. Next, in step $S'_3$ the CPU 64 monitors the state of the strobe line 19 via the receiver 53 and the inverter 26 and when the strobe pulse "0" by the operation in the aforementioned step $S_2$ of the control side is detected, the logic hold circuit 50 immediately holds the strobe line at "0" logic in step $S'_4$ and, in step $S'_5$ the CPU 64 fetches address data from the data line 13 via the receiver 54. In step $S'_6$ the CPU 64 checks whether the address thus inputted matches with the address of its own and, if not, the flip-flop 25 is reset via the driver 57 in step $S'_7$ to release the abovesaid logic holding state and the strobe line 19 is set to "1", after which the operation returns to step $S'_1$. If the address matches with the self-address in step $S'_6$, it is decided in step $S'_8$ whether the signal designated by the one bit in the inputted address data is the RECEIVE DATA command, and if not, it is decided that the signal is the SEND DATA command, and the operation proceeds to step $S'_{15}$. In the case of the RECEIVE DATA command, the flip-flop 25 is reset in step $S'_9$, releasing the logic hold state. That is, the strobe line 19 is set to "1" (FIG. 7C).

Immediately after the setting of the aforementioned strobe pulse, the control side equipment 11 monitors the strobe line 19 in step $S_3$ and when it is detected that the strobe line 19 becomes "1" as a result of releasing the logic hold state in step $S'_9$ on the side of the equipment under control 12 as described above, the select line 18 is set to "1" in step $S_4$ (FIG. 7A) and, in step $S_5$, the data $D_1$ is set on the data line 13. Thereafter, in step $S_6$, the strobe pulse "0" is sent out on the strobe line 19 to inform the equipment under control 12 of the data setting.

The equipment under control 12 monitors the strobe line 19 in step $S'_{10}$ immediately after releasing the logic hold state in step $S'_9$ as mentioned above and, upon detection of the strobe pulse sent out from the control side equipment 11 in step $S_6$, the logic hold circuit 50 holds the logic "0" of the strobe pulse in step $S'_{11}$. The CPU 64 fetches the data $D_1$ from the data line 13 in step $S'_{12}$ and it is checked in step $S'_{13}$ whether the fetched data is the END CODE. If not, the flip-flop 25 is reset in step $S'_{14}$, by which holding of the logic "0" is released, and the strobe line 19 is set to "1", informing the control side equipment 11 of the fact that the equipment under control 12 is ready for receiving the next data. Then the operation returns to step $S'_{10}$ in which the equipment 12 monitors the strobe line 19. If the END CODE is detected in step $S'_{13}$, "1" is applied to the clear terminal C of the flip-flop 25 via the driver 52 in step $S'_{15}$, by which the logic hold circuit 50 is disabled, thus completing the data reception.

In the control side equipment 11, when "1" on the strobe line 19 set in step $S'_{14}$ of the equipment under control 12 is detected in step $S_7$, it is checked in step $S_8$ whether the data transfer is completed and, if not, the operation returns to step $S_5$, in which the next data $D_2$ is set on the data line 13 (FIG. 7B). Thereafter, the same procedure is repeated until the data transfer is completed. In the operational flowchart of the equipment under control 12, it must be noted that steps $S'_4$ and $S'_{11}$ are executed by the hardware of the logic hold circuit 50 and are not included in the flow of operations by the controller 222.

Figures 8A, 8B:
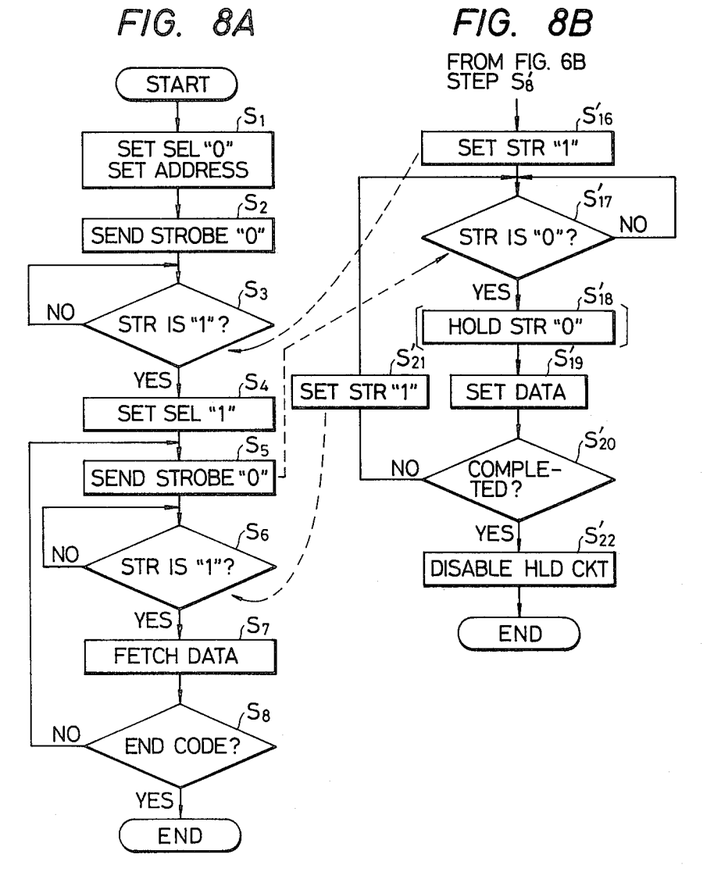
FIGS. 8A and 8B respectively show the flows of operations of the equipments 11 and 12 in the case of transferring data from the latter to the former.
Figure 9A:
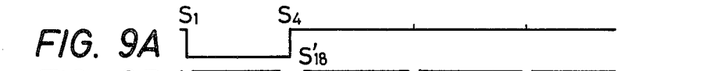
FIGS. 9A, 9B and 9C respectively show the states of the select line 18, the data line 13 and the strobe line 19 in the data transfer operations shown in FIGS. 8A and 8B.
Figures 9B, 9C:
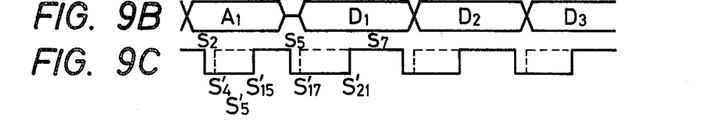

Next, a description will be given, with reference to FIGS. 8A, 8B, 9A, 9B and 9C, of the case of sending data from the equipment under control 12 of FIG. 5 to the control side equipment 11. FIG. 8A illustrates the flow of operations of the control side equipment 11, which is stored in the controller 112 (FIG. 1) as a program separate to that of FIG. 6A. FIG. 8B shows the flow of operations of the equipment under control 12, which is branched from step $S'_8$ in FIG. 6B. FIGS. 9A, 9B and 9C respectively show the states of the select line 18, the data line, 13 and the strobe line 19. Since the operations up to the detection of the self-address in the equipment under control 12 are the same as those shown in FIGS. 6A and 6B, no description will be repeated.

In the equipment under control 12, when it is detected in step $S'_8$ of FIG. 6B that the data on the data line 13 is the SEND DATA command, rather than the RECEIVE DATA command, the operation is branched to step $S'_{16}$ in FIG. 8B, in which the flip-flop 25 is reset to set the strobe line 19 to "1". Having this set "1" in step $S_3$, the control side equipment 11 sets the select line 18 to "1" in step $S_4$ and then sends out the strobe pulse "0" in step $S_5$.

When the equipment under control 12 detects this strobe pulse in step $S'_{17}$, the logic hold circuit 50 holds the strobe line 19 at "0" in step $S'_{18}$ and, at the same time, the CPU 64 sets data $D_1$ on the data line 13 in step $S'_9$. Further, in the case where it is decided in step $S'_{20}$ that the data transfer has not been completed yet, the flip-flop 25 is reset in step $S'_{21}$ to release the logic holding state, setting the strobe line 19 to "1". Then, the operation returns to step $S'_{17}$, in which to wait for the detection of a strobe pulse requesting the next data $D_2$.

By detecting in step $S_6$ that the strobe line 19 has been set to "1", the control side equipment 11 decides that the equipment under control 12 has set data, and the control side equipment 11 fetches the data $D_1$ from the data line 13 in step $S_7$. If it is decided in step $S_8$ that the data thus inputted is not the END CODE data, the operation returns to step $S_5$, in which the strobe pulse requesting the next data $D_2$ is sent out. Thereafter, the data reception is repeated in the same procedure until the END CODE is detected in step $S_8$.

In the equipment under control 12, when it is decided in step $S'_{20}$ that all data have been transferred, "1" is provided via the driver 52 to the clear terminal C of the flip-flop 25 to disable the logic hold circuit 50, Thus completing the operation.

Figure 10:
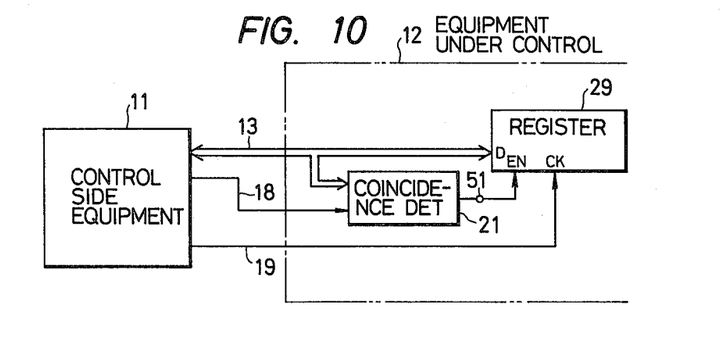
FIG. 10 illustrates a data transfer system in which the equipment under control is a data receiver for synchronous data transfer.

As has been described in the foregoing, according to the data transfer system of the present invention, data are transferred asynchronously through the data line 13 under the control of the single strobe line 19, that is, in the handshaking manner. In this data transfer system, however, since a pulse is sent out for each transfer of data on the data line from the control side, the synchronous data transfer system can also be carried out in a simple manner. For instance, as illustrated in FIG. 10, the address $A_1$ and data $D_1$, $D_2$, $D_3$... are sequentially sent from the control side equipment 11 to the equipment under control 12, together with strobe pulses (i.e. clock pulses) synchronized with the address and the data as shown in FIG. 4B. When it is detected by the coincidence detector 21 that the address $A_1$ is an address to the equipment under control 12, for example, a shift register 29 in the equipment under control 12 is activated by the output from the coincidence detector 21. The shift register 29 is supplied at its clock terminal CK with the pulse of the strobe line 19 and at its data input terminal D with the data of the data line 13. Accordingly, if the coincidence of address is detected, a pulse is provided on the strobe line 19 upon each subsequent transfer of data as shown in FIG. 4C, so that the data on the data line 13 are sequentially inputted to the shift register 29 without performing the handshake operation, thus performing the synchronous transfer. When the END CODE is detected in the data, the coincidence detector 21 provides a low-level output at its output terminal 51 to disable the shift register 29, finishing the data reception. It will be appreciated that the equipment under control may be arranged so that when the coincidence of address is detected by the coincidence detector 21, data may be sequentially sent out from the shift register 29 in synchronism with strobe pulses sent from the control side equipment 11 via the strobe line 19.

Figure 11:
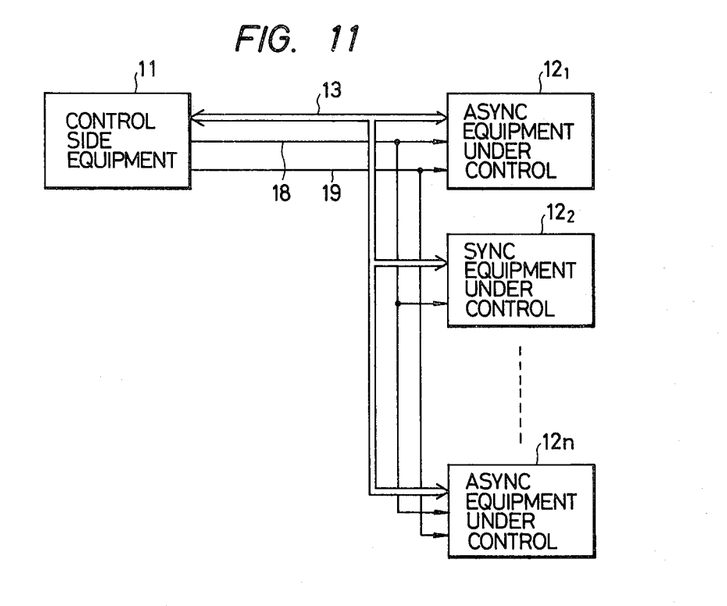
FIG. 11 is a block diagram illustrating a typical data transfer system of the present invention in which a plurality of equipments under control $12_1, 12_2, \ldots 12_n$ are connected to the control side equipment 12.

With the data transfer system according to the present invention, in the case of transmitting data while individually designating equipment under control through using the address as described in the above, the data can be selectively transferred to a plurality of equipments under control. For instance, as depicted in FIG. 11, a plurality of equipments $12_1$ to $12_n$ are connected together to the control side equipment 11 via the data line 13, the select line 18 and the strobe line 19, and data are selectively transferred to the plurality of equipments under control $12_1$ to $12_n$. In addition, these equipments $12_1$ to $12_n$ may be asynchronous or synchronous, or a combination of them. That is to say, for example, the synchronous equipment under control 12 such as shown in FIG. 10 is used as the equipment $12_2$ and the equipment such as shown in FIG. 1 or 5 is used as the others $12_1$ and $12_3$ to $12_n$. While in the foregoing the data line 13 is used for transmission of both address and data, it is also possible to omit the select line 18 and provide an address line exclusively for address transmission. Furthermore, in the case of one-to-one data transfer (one control side equipment and one equipment under control), since both the address line and the select line are unnecessary, the address detector and the associated devices are omitted.

It will be apparent that many modifications and variations may be effected without departing from the scope of the novel concepts of the present invention.

What is claimed is:

1. A data transfer system in which a control side equipment and at least one equipment under control are interconnected via data line means and a strobe line, the control side equipment including
data setting means for setting data on the data line means,
strobe pulse send-out means for sending out a strobe pulse on the strobe line, and
strobe line monitoring means for detecting the logic state of the strobe line and
said at least one equipment under control including
data fetch means for fetching data from the data line means,
strobe line logic detecting means for detecting the logic state of the strobe line,
logic hold means for holding the strobe line in the logic state of the strobe pulse when the strobe pulse is provided on the strobe line from the control side equipment, and
hold releasing means for releasing the logic hold means,
wherein said data is transferred asynchronously between said control side equipment and said at least one equipment under control in response to said control side equipment detecting said holding of the logic state of the strobe line, and after said fetching of said data, said holding of said logic state of the strobe line is released by said releasing means.

2. A data transfer system according to claim 1 wherein
the control side equipment further includes
control means for controlling the control side equipment in such a manner
that a data send-out command is provided to the data setting means for controlling said setting of data on the data line means,
that, after said setting of data, a command to send out a strobe pulse indicating the setting of the data is applied to the strobe pulse send-out means, and
that upon each detection of inversion of the logic state of the strobe line by the strobe line monitoring means corresponding to said releasing of the logic hold on the strobe line, a command for setting the next data is selectively provided to the data setting means, and
wherein said at least one equipment under control further includes
control means for controlling the equipment under control in such manner that, when it is detected by the strobe line logic state detecting means that the logic of the strobe line has been held by the logic hold means, a data fetch command is provided to the data fetch means, and that, when the equipment under control has become ready for receiving the next data after the fetching of the data, the hold releasing means releases the logic hold of the logic hold means.

3. A data transfer system according to claim 2 wherein the data setting means, the strobe pulse send-out means, the strobe line monitoring means and the control means of the control side equipment commonly comprise one microprocessor, and the data fetch means, the strobe line logic state detecting means, the hold releasing means and the control means of the equipment under control commonly comprise another microprocessor.

4. A data transfer system according to claim 1 wherein the control side equipment further includes control side data fetch means for fetching data from the data line means, and the equipment under control further includes data setting means for setting data on the data line means, wherein data may be selectively transferred from each said equipment under control to said control side equipment.

5. A data transfer system according to claim 4, wherein the control side equipment includes control means for controlling the control side equipment in such a manner that a command is provided to the strobe pulse send-out means to send out a strobe pulse indicating that the control side equipment is ready for receiving data, that, upon detection of the release of said holding of the logic of the strobe pulse by the strobe line monitoring means, a data fetch command is provided to the data fetch means, and that, when the control side equipment has become ready for receiving a subsequent data after said fetching of data, a subsequent strobe pulse send-out command is provided to the strobe pulse send-out means, and wherein said at least one equipment under control includes control means for control thereof in such a manner that, when it is detected by the strobe line logic detecting means that the logic of the strobe line has been held by the logic hold means, a data send-out command is provided to the data setting means of said at least one equipment under control, and that, after the setting of data responsive thereto, the holding of the logic by the logic holding means is released by the hold releasing means, wherein the data fetch means of the control side equipment fetches said data.

6. A data transfer system according to claim 5 wherein the data fetch means, the strobe pulse send-out means, the strobe line monitoring means and the control side control means of the control side equipment commonly comprise one microprocessor, and the data setting means, the strobe line logic detecting means, the hold releasing means and the control means of said at least one equipment under control commonly comprise another microprocessor.

7. A data transfer system according to claim 1 wherein the control side equipment further includes first control means for controlling the control side equipment in such a manner that a data send-out command is provided to the data setting means, that, after said setting of data, a command is provided to the strobe pulse send-out means for sending out a strobe pulse indicating that the data has been sent out, and that, upon each detection of inversion of the logic state of the strobe line by the strobe line monitoring means after the sending-out of the strobe pulse, a command is provided to the data setting means to set the next data; and control side data fetch means for fetching data from the data line means; and second control means for controlling the control side equipment in such a manner that a command is provided to the strobe pulse send-out means to send out a strobe pulse indicating that the control side equipment is ready for receiving data, that upon detection of release of the logic hold of the strobe pulse by the strobe line monitoring means, a data fetch command is provided to the data fetch means of the control side equipment, and that when the control side equipment has become ready for receiving the next data, a strobe pulse send-out command is provided to the strobe pulse send-out means, and wherein said at least one equipment under control further includes first control means for controlling the respective equipment under control in such a manner that, when it is detected by the strobe line logic detecting means that the logic of the strobe line has been held by the logic hold means, a data fetch command is provided to the data fetch means, and that, when the equipment under control has become ready for receiving the next data after the fetching of the data, a command is applied to the logic hold means to release the holding of the logic of the strobe line;

data setting means for setting data on the data line means; and second control means for controlling the respective equipment under control in such a manner that, when it is detected by the strobe line monitoring means that the logic of the strobe line has been held by the logic hold means, a data send-out command is provided to the data setting means of the respective equipment under control, and that, after the setting of the data, the holding of the logic state of the strobe line by the logic hold means is released by the hold releasing means.

8. A data transfer system according to claim 7 wherein the data setting means, the strobe pulse send-out means, the strobe line monitoring means, the first control means, the data fetch means and the second control means of the control side equipment commonly comprise one microprocessor, and wherein the data fetch means, the strobe line logic detecting means, the hold releasing means, the first control means, the data setting means and the second control means of said at least one equipment under control commonly comprise another microprocessor.

9. A data transfer system according to claim 7 wherein said at least one equipment under control further includes data transmission/reception deciding means for detecting the logic of a predetermined bit of address data sent via the data line means from the control side equipment to decide whether said at least one equipment under control is to carry out data transmission or data reception.

10. A data transfer system according to claim 9 wherein the data setting means, the strobe pulse send-out means, the strobe line monitoring means, the first control means, the data fetch means and the second control means of the control side equipment commonly comprise a microprocessor, and wherein the data fetch means, the strobe line logic detecting means, the logic hold releasing means, the first control means, the data setting means, the second control means and the data transmission/reception deciding means of the equipment under control commonly comprise another microprocessor.

11. A data transfer system according to claim 1, 2, 3, 4, 5, 6, 7, 8, 9 or 10 wherein the data line means comprises a data line composed of a plurality of bit lines, and a select line composed of one bit line for designating whether the data on the line is an address or data.

12. A data transfer system according to claim 1, 2, 3, 4, 5, 6, 7, 8, 9 or 10 wherein the data line means comprises a data line composed of a pluraltiy of bit lines, and an address line composed of a plurality of bit lines.

13. A data transfer system according to claim 1, 2, 3, 4, 5, 6, 7, 8, 9 or 10 comprising at least two of said equipments under control wherein each said equipment under control further includes address coincidence detecting means connected to the data line means, and the logic hold means of each said equipment under control is selectively enabled by the output from the address coincidence detecting means.

14. A data transfer system according to any one of claim 1, 2, 3, 4, 5, 6, 7, 8, 9 or 10 wherein said at least one equipment under control further includes END CODE detecting circuit means connected to the data line means, for detecting the end of data, and the logic hold means is disabled by the output from the END CODE detecting means.

15. A data transfer system according to claim 11 wherein said at least one equipment under control further includes coincidence detecting circuit means connected to the data line and the select line, and the logic hold means is enabled or disabled by the output from the coincidence detecting circuit means depending upon the logic state of the select line.

16. A data transfer system according to claim 1, 2, 3, 4, 5, 6, 7, 8, 9 or 10 wherein at least one synchronous data receiving equipment is connected via the data line means and the strobe line to the control side equipment in addition to each said equipment under control and the synchronous data receiving equipment includes coincidence detecting meams and register means connected to the data line means, wherein the register means is enabled by the coincidence output from the coincidence detecting means to fetch data from the data line means in synchronism with a strobe pulse send from the control side equipment via the strobe line.

17. A data transfer system according to claim 4, 5, 6, 7, 8, 9 or 10 wherein at least one synchronous data receiving equipment is connected via the data line means and the strobe line to the control side equipment in addition to each said equipment under control, the synchronous data receiving equipment includes coincidence detecting means and register means connected to the data line means, wherein the register means is enabled by the coincidence output from the coincidence detecting means to send out data through the data line means in synchronism with a strobe pulse sent out from the control side equipment via the strobe line.

18. A data transfer system according to claim 1, 2, 3, 4, 5, 6, 7, 8, 9 or 10 wherein the logic hold means includes a flip-flop that is set by a strobe pulse on the strobe line, with its output being provided to the strobe line to retain its logic state at the logic of the strobe pulse.

19. A data transfer system according to claim 18 wherein the output of the flip-flop has a high impedance.

20. A data transfer system according to any one of claim 1, 2, 3, 4, 5, 6, 7 or 8 wherein the strobe pulse send-out means has a high output impedance.

21. A data transfer system according to claim 3, 6, 8 or 10 wherein the microprocessor of said at least one equipment under control performs address coincidence detection for deciding whether address data fetched by the data fetch means is the address of the equipment under control.

22. A data transfer system according to claim 3, 6, 8 or 10 wherein the microprocessor of said at least one equipment under control performs END CODE detection for detecting the end of data and for accordingly disabling the logic hold means to complete the data input.

23. A data transfer system according to claim 3, 6, 8 or 10 wherein the microprocessor of said at least one equipment under control performs data counting, wherein, when the number of data inputted reaches a predetermined number, the data setting of said control side equipment is terminated as a result of said logic hold means being disabled.

* * * * *

UNITED STATES PATENT AND TRADEMARK OFFICE
CERTIFICATE OF CORRECTION

PATENT NO. : 4,486,750
DATED : December 4, 1984
INVENTOR(S) : Aoki

It is certified that error appears in the above-identified patent and that said Letters Patent is hereby corrected as shown below:

Col. 5, line 40, delete "de-";

line 41, delete "picted".

Col. 10, line 68, after "such" insert --a--.

Signed and Sealed this

First Day of December, 1987

Attest:

DONALD J. QUIGG

Attesting Officer      Commissioner of Patents and Trademarks